United States Patent
Hong et al.

(10) Patent No.: US 12,509,667 B2
(45) Date of Patent: Dec. 30, 2025

(54) CYTOCHROME P450 ENZYME MUTANT AND APPLICATION THEREOF

(71) Applicant: ASYMCHEM LIFE SCIENCE (TIANJIN) CO., LTD., Tianjin (CN)

(72) Inventors: Hao Hong, Morrisville, NC (US); Gage James, Morrisville, NC (US); Na Zhang, Tianjin (CN); Xuecheng Jiao, Tianjin (CN); Yulei Ma, Tianjin (CN); Shan Cao, Tianjin (CN); Yibing Cheng, Tianjin (CN); Kaihua Sun, Tianjin (CN)

(73) Assignee: ASYMCHEM LIFE SCIENCE (TIANJIN) CO., LTD., Tianjin (CN)

( * ) Notice: Subject to any disclaimer, the term of this patent is extended or adjusted under 35 U.S.C. 154(b) by 350 days.

(21) Appl. No.: 18/267,326

(22) PCT Filed: Apr. 25, 2021

(86) PCT No.: PCT/CN2021/089667
§ 371 (c)(1),
(2) Date: Jun. 14, 2023

(87) PCT Pub. No.: WO2022/151611
PCT Pub. Date: Jul. 21, 2022

(65) Prior Publication Data
US 2024/0010997 A1  Jan. 11, 2024

(30) Foreign Application Priority Data
Jan. 13, 2021 (CN) .................. 202110039458.8

(51) Int. Cl.
*C12N 9/02* (2006.01)
*C12N 15/70* (2006.01)
*C12P 7/02* (2006.01)
*C12P 7/24* (2006.01)

(52) U.S. Cl.
CPC ........... *C12N 9/0081* (2013.01); *C12N 15/70* (2013.01); *C12P 7/02* (2013.01); *C12P 7/24* (2013.01)

(58) Field of Classification Search
CPC .... C12N 9/0081; C12N 15/70; C12N 9/0071; C12P 7/02; C12P 7/24; C07K 14/415; C12Y 111/02004; C12Y 114/15006
See application file for complete search history.

(56) References Cited

U.S. PATENT DOCUMENTS

| | | | |
|---|---|---|---|
| 8,802,401 B2 | 8/2014 | Arnold et al. | |
| 9,663,532 B2 * | 5/2017 | Fasan | C12N 9/0042 |
| 10,865,400 B2 | 12/2020 | Wei et al. | |
| 2004/0213778 A1 | 10/2004 | Challita-Eid et al. | |
| 2017/0247725 A1 | 8/2017 | Coelho et al. | |
| 2020/0157581 A1 | 5/2020 | Hogsett | |

FOREIGN PATENT DOCUMENTS

| | | | |
|---|---|---|---|
| CA | 2100245 C | 7/2003 | |
| CN | 1367835 A | 9/2002 | |
| CN | 102300995 A | 12/2011 | |
| CN | 102399796 A | 4/2012 | |
| CN | 103946378 A | 7/2014 | |
| CN | 106459880 A | 2/2017 | |
| CN | 106574280 A | 4/2017 | |
| CN | 109082417 A | 12/2018 | |
| CN | 110055230 A | 7/2019 | |
| CN | 110730824 A | 1/2020 | |
| CN | 111218485 A | 6/2020 | |
| EP | 1470219 A2 | 10/2004 | |
| EP | 3178922 A1 | 6/2017 | |
| IN | 112359027 A | 2/2021 | |
| KR | 20180023734 A | 3/2018 | |
| WO | 2005017116 A2 | 2/2005 | |
| WO | 2008098198 A2 | 8/2008 | |
| WO | WO 2013/073775 A1 * | 5/2013 | ............. A61K 38/17 |
| WO | 2020191385 A1 | 9/2020 | |

OTHER PUBLICATIONS

Guengerich et al., Mechanisms of Cytochrome P450-Catalyzed Oxidations . ACS Catal., 2018, vol. 8: 10964-10976. (Year: 2018).*
International Search Report issued in International Application No. PCT/CN2021/089667, mailed Oct. 18, 2021, with English translation, 10 pages.
Hammer et al., "Anti-Markovnikov alkene oxidation by metal-oxomediated enzyme catalysis", Science, vol. 358, pp. 215-218 (2017).
Li et al., "Biosynthesis of organic molecules via artificial cascade reactions based on cytochrome P450 monooxygenases", Green Synthesis and Catalysis, https://doi.org/10.1016/j.gresc.2020.05.002, 8 pages (2020).
Urlacher et al., "Cytochrome P450 monooxygenases: perspectives for synthetic application", Trends in Biotechnology, vol. 24, No. 7, pp. 324-330 (2006).
Yin et al., "Unusually Broad Substrate Profile of Self-Sufficient Cytochrome P450 Monooxygenase CYP116B4 from Labrenzia aggregata", ChemBioChem, DOI: 10.1002/cbic.201402309, 8 pages (2014).

* cited by examiner

*Primary Examiner* — Ganapathirama Raghu
(74) *Attorney, Agent, or Firm* — Armstrong Teasdale LLP

(57) ABSTRACT

Provided are a cytochrome P450 enzyme mutant and an application thereof. The enzyme activity and anti-Markov oxidation selectivity of P450 derived from a wild-type strain of *Bacillus megaterium* undergo protein modification by means of directed evolution, thus improving enzyme activity and selectivity, and developing a series of P450 enzyme mutants that may be used for industrial production.

15 Claims, No Drawings
Specification includes a Sequence Listing.

SEQUENCE LISTING

```
<160> NUMBER OF SEQ ID NOS: 1

<210> SEQ ID NO 1
<211> LENGTH: 1051
<212> TYPE: PRT
<213> ORGANISM: Bacillus megaterium

<400> SEQUENCE: 1

Met Thr Ile Lys Glu Met Pro Gln Pro Lys Thr Phe Gly Glu Leu Lys
1               5                   10                  15

Asn Leu Pro Leu Leu Asn Thr Asp Lys Pro Val Gln Ala Leu Met Lys
            20                  25                  30

Ile Ala Asp Glu Leu Gly Glu Ile Phe Lys Phe Glu Ala Pro Gly Arg
        35                  40                  45

Val Thr Arg Tyr Leu Ser Ser Gln Arg Leu Ile Lys Glu Ala Cys Asp
    50                  55                  60

Glu Ser Arg Phe Asp Lys Asn Leu Ser Gln Ala Leu Lys Phe Val Arg
65                  70                  75                  80

Asp Phe Ala Gly Asp Gly Leu Phe Thr Ser Trp Thr His Glu Lys Asn
                85                  90                  95

Trp Lys Lys Ala His Asn Ile Leu Leu Pro Ser Phe Ser Gln Gln Ala
            100                 105                 110

Met Lys Gly Tyr His Ala Met Met Val Asp Ile Ala Val Gln Leu Val
        115                 120                 125

Gln Lys Trp Glu Arg Leu Asn Ala Asp Glu His Ile Glu Val Pro Glu
    130                 135                 140
```

```
Asp Met Thr Arg Leu Thr Leu Asp Thr Ile Gly Leu Cys Gly Phe Asn
145                 150                 155                 160

Tyr Arg Phe Asn Ser Phe Tyr Arg Asp Gln Pro His Pro Phe Ile Thr
                165                 170                 175

Ser Met Val Arg Ala Leu Asp Glu Ala Met Asn Lys Leu Gln Arg Ala
            180                 185                 190

Asn Pro Asp Asp Pro Ala Tyr Asp Glu Asn Lys Arg Gln Phe Gln Glu
        195                 200                 205

Asp Ile Lys Val Met Asn Asp Leu Val Asp Lys Ile Ile Ala Asp Arg
    210                 215                 220

Lys Ala Ser Gly Glu Gln Ser Asp Asp Leu Leu Thr His Met Leu Asn
225                 230                 235                 240

Gly Lys Asp Pro Glu Thr Gly Glu Pro Leu Asp Asp Glu Asn Ile Arg
                245                 250                 255

Tyr Gln Ile Ile Thr Phe Leu Ile Ala Gly His Glu Thr Thr Ser Gly
                260                 265                 270

Leu Leu Ser Phe Ala Leu Tyr Phe Leu Val Lys Asn Pro His Val Leu
            275                 280                 285

Gln Lys Ala Ala Glu Ala Ala Arg Val Leu Val Asp Pro Val Pro
        290                 295                 300

Ser Tyr Lys Gln Val Lys Gln Leu Lys Tyr Val Gly Met Val Leu Asn
305                 310                 315                 320

Glu Ala Leu Arg Leu Trp Pro Thr Ala Pro Ala Phe Ser Leu Tyr Ala
                325                 330                 335

Lys Glu Asp Thr Val Leu Gly Gly Glu Tyr Pro Leu Glu Lys Gly Asp
                340                 345                 350

Glu Leu Met Val Leu Ile Pro Gln Leu His Arg Asp Lys Thr Ile Trp
            355                 360                 365

Gly Asp Asp Val Glu Glu Phe Arg Pro Glu Arg Phe Glu Asn Pro Ser
        370                 375                 380

Ala Ile Pro Gln His Ala Phe Lys Pro Phe Gly Asn Gly Gln Arg Ala
385                 390                 395                 400

Cys Ile Gly Gln Gln Phe Ala Leu His Glu Ala Thr Leu Val Leu Gly
                405                 410                 415

Met Met Leu Lys His Phe Asp Phe Glu Asp His Thr Asn Tyr Glu Leu
                420                 425                 430

Asp Ile Lys Glu Thr Leu Thr Leu Lys Pro Glu Gly Phe Val Val Lys
            435                 440                 445

Ala Lys Ser Lys Lys Ile Pro Leu Gly Gly Ile Pro Ser Pro Ser Thr
        450                 455                 460

Glu Gln Ser Ala Lys Lys Val Arg Lys Lys Ala Glu Asn Ala His Asn
465                 470                 475                 480

Thr Pro Leu Leu Val Leu Tyr Gly Ser Asn Met Gly Thr Ala Glu Gly
                485                 490                 495

Thr Ala Arg Asp Leu Ala Asp Ile Ala Met Ser Lys Gly Phe Ala Pro
            500                 505                 510

Gln Val Ala Thr Leu Asp Ser His Ala Gly Asn Leu Pro Arg Glu Gly
        515                 520                 525

Ala Val Leu Ile Val Thr Ala Ser Tyr Asn Gly His Pro Pro Asp Asn
        530                 535                 540

Ala Lys Gln Phe Val Asp Trp Leu Asp Gln Ala Ser Ala Asp Glu Val
545                 550                 555                 560
```

```
Lys Gly Val Arg Tyr Ser Val Phe Gly Cys Gly Asp Lys Asn Trp Ala
                565                 570                 575

Thr Thr Tyr Gln Lys Val Pro Ala Phe Ile Asp Glu Thr Leu Ala Ala
            580                 585                 590

Lys Gly Ala Glu Asn Ile Ala Asp Arg Gly Glu Ala Asp Ala Ser Asp
        595                 600                 605

Asp Phe Glu Gly Thr Tyr Glu Glu Trp Arg Glu His Met Trp Ser Asp
    610                 615                 620

Val Ala Ala Tyr Phe Asn Leu Asp Ile Glu Asn Ser Glu Asp Asn Lys
625                 630                 635                 640

Ser Thr Leu Ser Leu Gln Phe Val Asp Ser Ala Ala Asp Met Pro Leu
                645                 650                 655

Ala Lys Met His Gly Ala Phe Ser Thr Asn Val Val Ala Ser Lys Glu
            660                 665                 670

Leu Gln Gln Pro Gly Ser Ala Arg Ser Thr Arg His Leu Glu Ile Glu
        675                 680                 685

Leu Pro Lys Glu Ala Ser Tyr Gln Glu Gly Asp His Leu Gly Val Ile
    690                 695                 700

Pro Arg Asn Tyr Glu Gly Ile Val Asn Arg Val Thr Ala Arg Phe Gly
705                 710                 715                 720

Leu Asp Ala Ser Gln Gln Ile Arg Leu Glu Ala Glu Glu Lys Leu
                725                 730                 735

Ala His Leu Pro Leu Ala Lys Thr Val Ser Val Glu Leu Leu Gln
            740                 745                 750

Tyr Val Glu Leu Gln Asp Pro Val Thr Arg Thr Gln Leu Arg Ala Met
    755                 760                 765

Ala Ala Lys Thr Val Cys Pro Pro His Lys Val Glu Leu Glu Ala Leu
770                 775                 780

Leu Glu Lys Gln Ala Tyr Lys Glu Gln Val Leu Ala Lys Arg Leu Thr
785                 790                 795                 800

Met Leu Glu Leu Leu Glu Lys Tyr Pro Ala Cys Glu Met Lys Phe Ser
                805                 810                 815

Glu Phe Ile Ala Leu Leu Pro Ser Ile Arg Pro Arg Tyr Tyr Ser Ile
            820                 825                 830

Ser Ser Ser Pro Arg Val Asp Glu Lys Gln Ala Ser Ile Thr Val Ser
        835                 840                 845

Val Val Ser Gly Glu Ala Trp Ser Gly Tyr Gly Glu Tyr Lys Gly Ile
    850                 855                 860

Ala Ser Asn Tyr Leu Ala Glu Leu Gln Glu Gly Asp Thr Ile Thr Cys
865                 870                 875                 880

Phe Ile Ser Thr Pro Gln Ser Glu Phe Thr Leu Pro Lys Asp Pro Glu
                885                 890                 895

Thr Pro Leu Ile Met Val Gly Pro Gly Thr Gly Val Ala Pro Phe Arg
            900                 905                 910

Gly Phe Val Gln Ala Arg Lys Gln Leu Lys Glu Gln Gly Gln Ser Leu
        915                 920                 925

Gly Glu Ala His Leu Tyr Phe Gly Cys Arg Ser Pro His Glu Asp Tyr
    930                 935                 940

Leu Tyr Gln Glu Glu Leu Glu Asn Ala Gln Ser Glu Gly Ile Ile Thr
945                 950                 955                 960

Leu His Thr Ala Phe Ser Arg Met Pro Asn Gln Pro Lys Thr Tyr Val
                965                 970                 975

Gln His Val Met Glu Gln Asp Gly Lys Lys Leu Ile Glu Leu Leu Asp
```

```
            980             985             990
Gln Gly Ala His Phe Tyr Ile Cys Gly Asp Gly Ser Gln Met Ala Pro
        995                 1000                1005

Ala Val Glu Ala Thr Leu Met Lys Ser Tyr Ala Asp Val His Gln Val
    1010                1015                1020

Ser Glu Ala Asp Ala Arg Leu Trp Leu Gln Gln Leu Glu Glu Lys Gly
1025                1030                1035                1040

Arg Tyr Ala Lys Asp Val Trp Ala Gly Leu Glu
                1045                1050
```

CYTOCHROME P450 ENZYME MUTANT AND APPLICATION THEREOF

CROSS-REFERENCE TO RELATED APPLICATIONS

The present application is a National Stage Entry of International Patent Application No. PCT/CN2021/089667, filed on Apr. 25, 2021, which claims the priority of Chinese Patent Application No. 202110039458.8, filed on Jan. 13, 2021, which are herein incorporated by reference in their entirety.

REFERENCE TO AN ELECTRONIC SEQUENCE LISTING

The contents of the electronic sequence listing (PN206599SEQLIST.txt; Size: 9,125 bytes; and Date of Creation: Jun. 14, 2023) are herein incorporated by reference in their entirety.

TECHNICAL FIELD

The present invention relates to the technical field of enzymes, in particular to a cytochrome P450 enzyme mutant and an application thereof.

BACKGROUND

An anti-Markov oxidation reaction of catalyzing olefin raw materials may simplify the synthesis routes of many important chemical raw materials. It is a very important challenge in organic synthesis to generate a corresponding carbonyl compound by performing the direct anti-Markov oxidation reaction on olefin compounds, and this process often requires the participation of efficient catalysts. In existing synthesis methods, the use of noble metals as catalysts has problems such as low conversion efficiency and enantioselectivity, the need for multi-step catalysis, and many three-wastes [G. Dong, P. Teo, Z. K. Wickens, R. H. Grubbs, Primary alcohols from terminal olefins: Formal anti-Markovnikov hydration via triple relay catalysis. Science 333, 1609-1612 (2011)].

Cytochrome P450 monooxygenase (P450s) is a class of heme-dependent enzyme families, oxygen is used as an oxidant, it may selectively activate a C—H bond under the mild conditions, catalyze a variety of synthesis reactions that are difficult to achieve by traditional chemical methods, including an oxidation reaction of olefins, and it has a great application potential in fine chemistry and the synthesis of drugs and its metabolites. P450 (BM3) derived from *Bacillus megaterium* belongs to self-sufficient monooxygenase, namely redox protein chaperone involved in electron transfer and P450 oxidase are partially fused on a peptide chain. This fusion recombination structure greatly improves the electron transfer efficiency and the electron coupling efficiency of the oxidation reaction, and BM3 is also one of P450 enzymes with the higher catalytic efficiency at present.

However, there is no report of the BM3 enzyme that may efficiently catalyze the anti-Markov oxidation reaction of the olefin compounds.

SUMMARY

A main purpose of the present invention is to provide a cytochrome P450 enzyme mutant and an application thereof, as to solve a problem in existing technologies that there is no P450 enzyme that may efficiently catalyze an anti-Markov oxidation reaction of olefin compounds.

In order to achieve the above purpose, according to one aspect of the present invention, a cytochrome P450 enzyme mutant is provided, and the mutant includes: (a) a protein with one or more amino acid mutations on a sequence of SEQ ID NO: 1, and the protein has the anti-Markov oxidation activity of the cytochrome P450 enzyme; or (b) a strain derived from *Bacillus megaterium,* having an amino acid sequence with more than 80% identity with SEQ ID NO: 1, and having anti-Markov oxidation activity of the cytochrome P450 enzyme.

Further, the mutant is a protein with any one or more of 1~14 amino acid mutations occurring on the sequence of SEQ ID NO: 1, preferably 2~14, more preferably 3~14, and further preferably 10~14 amino acid mutations, and the protein has the anti-Markov oxidation activity of the cytochrome P450 enzyme.

Further, the mutant is a strain derived from *Bacillus megaterium,* and has more than 85%, preferably more than 90%, more preferably more than 95%, and further preferably more than 99% of identity with SEQ ID NO: 1, and has the anti-Markov oxidation activity of the cytochrome P450 enzyme; and further preferably, the mutant generates any one or more of 1~14 amino acid mutations on the basis of SEQ ID NO: 1, preferably 2~14, more preferably 3~14, and further preferably 10~14 amino acid mutations.

Further, the mutant generates the amino acid mutation on the basis of SEQ ID NO: 1:

V79A + F332A
V79A + F332A + A75V
V79A + F332A + A75F
V79A + F332A + L76A
V79A + F332A + A83F
V79A + F332A + A83V
V79A + F332A + F88A
V79A + F332A + F88V
V79A + F332A + T89A
V79A + F332A + T89V
V79A + F332A + A265V
V79A + F332A + A265F
V79A + F332A + T269V
V79A + F332A + T269A
V79A + F332A + T269F
V79A + F332A + A329V
V79A + F332A + A329F
V79A + F332A + A331F
V79A + F332A + A331V
V79A + F332A + L438A

-continued

V79A + F332A + L438F
V79A + F332A + C63Y
V79A + F332A + C63Y + S107C
V79A + F332A + C63Y + S107C + Q129L
V79A + F332A + C63Y + S107C + Q129 + E229K
V79A + F332A + C63Y + S107C + Q129 + E229K + Q388L
V79A + F332A + C63Y + S107C + Q129 + E229K + Q388L + T428I
V79A + F332A + C63Y + S107C + Q129 + E229K + Q388L T428I + N320I
V79A + F332A + C63Y + S107C + Q129 + E229K + Q388L T428I + S165G
V79A + F332A + C63Y + S107C + Q129 + E229K + Q388L T428I + F78L
V79A + F332A + C63Y + S107C + Q129 + E229K + Q388L + T428I + F78L + I175S
V79A + F332A + C63Y + S107C + Q129 + E229K + Q388L + T428I + F78L + I175S + A331P
V79A + F332A + C63Y + S107C + Q129 + E229K + Q388L + T428I + F78L + I175S + A331G
V79A + F332A + C63Y + S107C + Q129 + E229K + Q388L + T428I + F78L + I175S + A331D
V79A + F332A + C63Y + S107C + Q129 + E229K + Q388L + T428I + F78L + I175S + A329K
V79A + F332A + C63Y + S107C + Q129 + E229K + Q388L + T428I + F78L + I175S + A329L
V79A + F332A + C63Y + S107C + Q129 + E229K + Q388L + T428I + F78L + I175S + A75R
V79A + F332A + C63Y + S107C + Q129 + E229K + Q388L + T428I + F78L + I175S + A329Y + A331P
V79A + F332A + C63Y + S107C + Q129 + E229K + Q388L + T428I + F78L + I175S + A329L + A331P
V79A + F332A + C63Y + S107C + Q129 + E229K + Q388L + T428I + F78L + I175S + A329K + A331F
V79A + F332A + C63Y + S107C + Q129 + E229K + Q388L + T428I + F78L + I175S + A329K + A331R
V79A + F332A + C63Y + S107C + Q129 + E229K + Q388L + T428I + F78L + I175S + A329K + A331D
V79A + F332A + C63Y + S107C + Q129 + E229K + Q388L + T428I + F78L + I175S + A329K + R48H
V79A + F332A + C63Y + S107C + Q129 + E229K + Q388L + T428I + F78L + I175S + A329K + Y52G
V79A + F332A + C63Y + S107C + Q129 + E229K + Q388L + T428I + F78L + I175S + A329K + Q74L
V79A + F332A + C63Y + S107C + Q129 + E229K + Q388L + T428I + F78L + I175S + A329K + T269P
V79A + F332A + C63Y + S107C + Q129 + E229K + Q388L + T428I + F78L + I175S + A329K + S333H
V79A + F332A + C63Y + S107C + Q129 + E229K + Q388L + T428I + F78L + I175S + A329K + S333M
V79A + F332A + C63Y + S107C + Q129 + E229K + Q388L + T428I + F78L + I175S + A329K + M355F
V79A + F332A + C63Y + S107C + Q129 + E229K + Q388L + T428I + F78L + I175S + A329K + M355K
V79A + F332A + C63Y + S107C + Q129 + E229K + Q388L + T428I + F78L + I175S + A329K + L182I
V79A + F332A + C63Y + S107C + Q129 + E229K + Q388L + T428I + F78L + I175S + A329K + L182M
V79A + F332A + C63Y + S107C + Q129 + E229K + Q388L + T428I + F78L + I175S + A329K + A331F + S333Q
V79A + F332A + C63Y + S107C + Q129 + E229K + Q388L + T428I + F78L + I175S + A329K + A331F + S333V
V79A + F332A + C63Y + S107C + Q129 + E229K + Q388L + T428I + F78L + I175S + A329K + A331F + W91M
V79A + F332A + C63Y + S107C + Q129 + E229K + Q388L + T428I + F78L + I175S + A329K + A331F + S90C
V79A + F332A + C63Y + S107C + Q129 + E229K + Q388L + T428I + F78L + I175S + A329K + A331F + L18V
V79A + F332A + C63Y + S107C + Q129 + E229K + Q388L + T428I + F78L + I175S + A329K + A331F + S90V
V79A + F332A + C63Y + S107C + Q129 + E229K + Q388L + T428I + F78L + I175S + A329K + A331F + S90G
V79A + F332A + C63Y + S107C + Q129 + E229K + Q388L + T428I + F78L + I175S + A329K + S333H + L182A
V79A + F332A + C63Y + S107C + Q129 + E229K + Q388L + T428I + F78L + I175S + A329K + S333H + L182G
V79A + F332A + C63Y + S107C + Q129 + E229K + Q388L + T428I + F78L + I175S + A329K + S333H + L182M
V79A + F332A + C63Y + S107C + Q129 + E229K + Q388L + T428I + F78L + I175S + A329K + S333H + L182F
V79A + F332A + C63Y + S107C + Q129 + E229K + Q388L + T428I + F78L + I175S + A329K + S333H + A331P
V79A + F332A + C63Y + S107C + Q129 + E229K + Q388L + T428I + F78L + I175S + A329K + S333H + S331S
V79A + F332A + C63Y + S107C + Q129 + E229K + Q388L + T428I + F78L + I175S + A329K + S333M + M355W
V79A + F332A + C63Y + S107C + Q129 + E229K + Q388L + T428I + F78L + I175S + A329K + S333M + M355G

In order to achieve the above purpose, according to one aspect of the present invention, a DNA molecule is provided to encode any one of the above mutants.

In order to achieve the above purpose, according to one aspect of the present invention, a recombinant vector is provided, and the recombinant vector is linked with the above DNA molecule.

Further, the recombinant vector is selected from any one of the following: pET-21b(+), pET-22b(+), pET-3a(+), pET-3d(+), pET-11a(+), pET-12a(+), pET-14b, pET-15b(+), pET-16b(+), pET-17b(+), pET-19b(+), pET-20b(+), pET-21a(+), pET-23a(+), pET-23b(+), pET-24a(+), pET-25b(+), pET-26b(+), pET-27b(+), pET-28a(+), pET-29a(+), pET-30a(+), pET-31b(+), pET-32a(+), pET-35b(+), pET-38b(+), pET-39b(+), pET-40b(+), pET-41a(+), pET-41b(+), pET-42a(+), pET-43a(+), pET-43b(+), pET-44a(+), pET-49b(+), pQE2, pQE9, pQE3O, pQE31, pQE32, pQE40, pQE70, pQE80, pRSET-A, pRSET-B, pRSET-C, pGEX-5X-1, pGEX-6p-1, pGEX-6p-2, pBV220, pBV221, pBV222, pTrc99A, pTwin1, pEZZ18, pKK232-8, pUC-18 or pUC-19.

In order to achieve the above purpose, according to one aspect of the present invention, a host cell is provided, and the host cell contains any one of the above recombinant vectors.

Further, the host cell is a prokaryotic cell or a eukaryotic cell, and preferably the eukaryotic cell is a yeast cell.

Further, the host cell is a competent cell, and preferably the competent cell is an *Escherichia coli* BL21 cell or an *Escherichia coli* W3110 cell.

In order to achieve the above purpose, according to one aspect of the present invention, a method of producing a carbonyl compound or an alcohol compound is provided, and the method includes: using any one of the above cytochrome P450 enzyme mutants to catalyze a direct anti-Markov oxidation reaction of an olefin compound

to generate the carbonyl compound

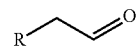

and the alcohol compound

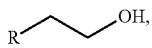

herein R represents an optionally substituted or unsubstituted alkyl, an optionally substituted or unsubstituted aralkyl, or an optionally substituted or unsubstituted aryl.

Further, R represents a group having 1-20 carbon atoms selected from an optionally substituted or unsubstituted alkyl, an optionally substituted or unsubstituted aralkyl, or an optionally substituted or unsubstituted aryl; preferably, R represents a group having 1-10 carbon atoms selected from an optionally substituted or unsubstituted alkyl, an optionally substituted or unsubstituted aralkyl, or an optionally substituted or unsubstituted aryl; preferably, substituted refers to a substitution by a halogen atom, a nitrogen atom, a sulfur atom, a hydroxyl, a nitro group, a cyano group, a methoxy group, an ethoxy group, a carboxyl, a carboxymethyl, a carboxyethyl or a methylenedioxy; preferably, the olefin compound is a styrene compound that is substituted or unsubstituted at any position on a benzene rind, and the reaction is the anti-Markov oxidation reaction of generating

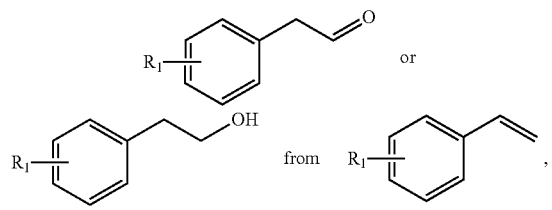

herein $R_1$ represents a halogen, a nitro group, a methyl or a methoxy group substituted at any position on the benzene ring; preferably, halogen substitution is a chlorine atom substitution; and more preferably, the olefin compound is any one of the following:

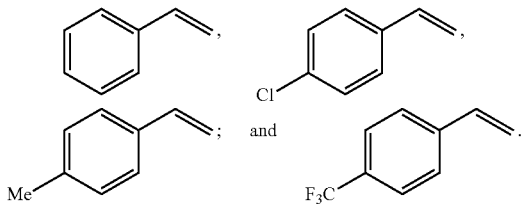

A technical scheme of the present invention is applied, the protein modification of the wild enzyme is performed by means of directed evolution, the activity and selectivity of the enzyme are improved, and the P450 enzyme that may be used for industrial production is developed.

DETAILED DESCRIPTION OF THE EMBODIMENTS

It should be noted that embodiments in the present application and features in the embodiments may be combined with each other without conflicting. The present invention is described in detail below in combination with the embodiments.

Since there is no report of a BM3 enzyme that may efficiently catalyze an anti-Markov oxidation reaction of an olefin compound. In order to improve this situation, the inventor of the present application finds that BM3 has the activity of catalyzing the anti-Markov oxidation reaction of the olefin compound by enzyme screening, but its activity is relatively low and the selectivity of anti-Markov oxidation is relatively poor. In order to further improve its catalytic reaction activity and/or its selectivity, the inventor performs protein modification on the wild enzyme by means of directed evolution, the activity and selectivity of the enzyme are improved, and the P450 enzyme that may be used for industrial production is developed.

The inventor of the present invention improves the P450 enzyme activity and the selectivity of anti-Markovian oxidation of the wild-type strain derived from *Bacillus megaterium* by a method of directed evolution, and reduces the usage amount of the enzyme. Firstly, a mutant site is introduced on the wild-type P450 enzyme SEQ ID NO: 1 by a mode of a whole-vector polymerase chain reaction (PCR), to detect the activity and selectivity of the mutant and select the mutant with the increased activity and selectivity (namely the proportion of aldehyde in a total product).

A P450 enzyme-catalyzed anti-Markov oxidation reaction formula is as follows:

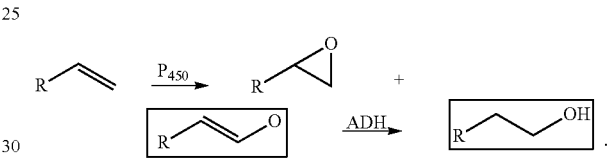

The cytochrome P450 enzyme mutant provided by the present invention may catalyze an olefin substrate to generate aldehyde, and the aldehyde may be further reduced into alcohol by a coenzyme.

The sequence SEQ ID NO: 1 of the wild-type P450 enzyme derived from *Bacillus megaterium* is as follows:

MTIKEMPQPKTFGELKNLPLLNTDKPVQALMKIADELGEIFKFEAPGRV

TRYLSSQRLIKEACDESRFDKNLSQALKFVRDFAGDGLFTSWTHEKNWK

KAHNILLPSFSQQAMKGYHAMMVDIAVQLVQKWERLNADEHIEVPEDMT

RLTLDTIGLCGFNYRFNSFYRDQPHPFITSMVRALDEAMNKLQRANPDD

PAYDENKRQFQEDIKVMNDLVDKIIADRKASGEQSDDLLTHMLNGKDPE

TGEPLDDENIRYQIITFLIAGHETTSGLLSFALYFLVKNPHVLQKAAEE

AARVLVDPVPSYKQVKQLKYVGMVLNEALRLWPTAPAFSLYAKEDTVLG

GEYPLEKGDELMVLIPQLHRDKTIWGDDVEEFRPERFENPSAIPQHAFK

PFGNGQRACIGQQFALHEATLVLGMMLKHFDFEDHTNYELDIKETLTLK

PEGFVVKAKSKKIPLGGIPSPSTEQSAKKVRKKAENAHNTPLLVLYGSN

MGTAEGTARDLADIAMSKGFAPQVATLDSHAGNLPREGAVLIVTASYNG

HPPDNAKQFVDWLDQASADEVKGVRYSVFGCGDKNWATTYQKVPAFIDE

TLAAKGAENIADRGEADASDDFEGTYEEWREHMWSDVAAYFNLDIENSE

DNKSTLSLQFVDSAADMPLAKMHGAFSTNWVASKELQQPGSARSTRHLE

IELPKEASYQEGDHLGVIPRNYEGIVNRVTARFGLDASQQIRLEAEEEK

LAHLPLAKTVSVEELLQYVELQDPVTRTQLRAMAAKTVCPPHKVELEAL

LEKQAYKEQVLAKRLTMLELLEKYPACEMKFSEFIALLPSIRPRYYSIS

-continued

SSPRVDEKQASITVSVVSGEAWSGYGEYKGIASNYLAELQEGDTITCFI

STPQSEFTLPKDPETPLIMVGPGTGVAPFRGFVQARKQLKEQGQSLGEA

HLYFGCRSPHEDYLYQEELENAQSEGIITLHTAFSRMPNQPKTYVQHVM

EQDGKKLIELLDQGAHFYICGDGSQMAPAVEATLMKSYADVHQVSEADA

RLWLQQLEEKGRYAKDVWAGLE.

The sequence SEQ ID NO: 1 of the wild-type P450 enzyme is used as a template, 27 pairs of site-directed mutation primers (A75V, A75F, L76AL76I, L76F, V79A, V79L, V79F, A83F, A83 V, F88A, F88V, T89A, T89V, A265V, A265F, T269V, T269A, T269F , A329V, A329F, A331F, A331V, F332A, F332V, L438A, L438F) are designed. The site-directed mutation means is used, and pET-22b (+) is used as an expression vector, to obtain a mutation vector with a target gene.

Herein, site-directed mutation: referring to introduction of required changes (usually changes that represent favorable directions) into a target DNA segment (either a genome or a vector) by a polymerase chain reaction (PCR) and other methods, including base addition, deletion, point mutation and the like. The site-directed mutation may rapidly and efficiently improve the character and representation of a target protein expressed by DNA, and is a very useful means in gene research work.

A method of introducing the site-directed mutation by the whole-vector PCR is simple and effective, and is more widely used at present. The principle thereof is that a pair of primers (forward and reverse) containing mutation sites and a template vector are "extended circularly" by polymerase after annealing, the so-called circular extension refers to a cycle in which the polymerase extends the primer according to the template, returns to a 5'-end of the primer after one circle, and then undergoes repeated heating and annealing extension. This reaction is different from rolling circle amplification, and does not form a plurality of serial copies. Extension products of the forward and reverse primers are paired after annealing to form an open circular vector with a notch. A Dpn I enzyme-digested extension product, because the original template vector is from conventional *Escherichia coli,* is modified by dam-methylation, and chopped because it is sensitive to Dpn I, and the vector with the mutation sequence synthesized in vitro is not chopped because it is not methylated, so it is successfully transformed in subsequent transformation to obtain a clone of the mutation vector.

On the basis of acquiring the mutant with the improved characters by single point mutation, beneficial amino acid sites may be combined, to obtain a mutant with the better characters.

After the P450 mutant with the significantly improved activity and selectivity of anti-Markov oxidation is obtained, an error-prone PCR method is used to randomly mutate it, a high-quality mutant library is constructed, a suitable high-throughput screening method is developed, and the library is screened, to obtain a mutant with the further improved characters.

Error-prone PCR: it means PCR under error-prone conditions, namely a PCR technology that is easy to make mistakes in the copied DNA sequence, also known as mismatch PCR or error-tendency PCR. Specifically, it refers to a method of inducing DNA sequence variation in vitro by using low-fidelity TaqDNA polymerase and changing PCR reaction conditions, reducing fidelity of DNA replication, and increasing base mismatch in the synthesis process of a new DNA chain, as to cause more point mutations in an amplification product.

The error-prone PCR is the most simple and effective gene random mutation technology in vitro at present, and its principle is that: the isomerism of bases provides the possibility for mismatch, and 4 bases that make up DNA all have tautomers, herein 3 oxygen-containing bases of guanine (G), cytosine (C) and thymine (T) have keto-type and enol-type two tautomers; and 2 nitrogen-containing bases of adenine (A) and thymine have amine-type and imine-type two tautomers. G, C and T mainly exist in the keto-type structure, and the ratio of the enol-type structure is very low. Nitrogen atoms on the two nitrogen-containing bases A and T mainly exist in the amino ($NH_2$) state, and the ratio of existence in the imino (NH) state is very low. The different positions of hydrogen atoms between different isomers and the different directions of electron cloud deviation at the same position may change the pairing form of the bases, and this may lead to mismatch on a replicated sub-chain. For example, while the thymine exists in the keto-type structure, it is paired with the adenine, and while it exists in the enol-type structure, it is paired with the guanine, this leads to the occurrence of an unstable base pair in which A may match C and T may match G, as to cause the mismatch.

Among several known heat-resistant DNA polymerases, TaqDNA polymerase has the highest mismatch rate. The TaqDNA polymerase is one of the most active heat-resistant DNA polymerases found, has 5'-3' excision enzyme activity and does not have 3'-5' excision enzyme activity. Therefore, there is no correction function for some single nucleotide mismatches in synthesis, so the probability of the mismatch is higher than that of the DNA polymerase with the 3'-5' correction activity. The fidelity of the DNA polymerase may be reduced by a variety of methods, including using 4 different concentrations of dNTP, adding $Mn^{2+}$, and increasing the concentration of $Mg^{2+}$ and the like. Several mutation methods lead to different mechanisms of amplified DNA chain base variation. $MnCl_2$ is a mutagen of the DNA polymerase. Adding $Mn^{2+}$ may reduce the specificity of the polymerase to a template and improve the mismatch rate; the disequilibrium of the 4 dNTPs concentrations may increase the probability of base misincorporation and achieve the mismatch; $Mg^{2+}$ has an effect of activating a Taq enzyme, the concentration of $Mg^{2+}$ is increased, so that it exceeds the normal amount, and a non-complementary base pair may be stabilized; the amount of the TaqDNA polymerase is increased, and the extension time of each cycle is increased, thus the probability of mismatch terminal extension may be increased; and the initial template concentration is reduced, so the proportion of variation templates in subsequent PCR cycles may be increased.

By screening the mutant library constructed by the error-prone PCR, the P450 mutant with the further improved activity and anti-Markov oxidation selectivity is obtained. 31 saturated mutation primers (R48, R52, N71, L72, S73, Q74, A75, L76, F82, A83, D85, G86, F88, T89, S90, W91, R148, S165, H172, P173, F174, L182, I264, A265, T269, P327, A329, A331, S333, M355, L440) are designed to further perform mutant evolution, as to obtain the mutation with the best activity and anti-Markov oxidation selectivity.

Saturation mutation is a method to obtain a mutant of which target site amino acids are respectively substituted by 19 other amino acids in a short time by modifying a coding gene of the target protein. This method is not only a powerful tool for protein directed modification, but also an important means for the research of protein structure-function relationship. The saturation mutation may often obtain more ideal evolution than the single point mutation. However, these problems that may not be solved by the site-directed mutation method are precisely the unique characteristics of the saturation mutation method.

It is described above that the mutation vector is transformed into the *Escherichia coli* cells and overexpressed in the *Escherichia coli*. Then the crude enzyme is obtained by the method of ultrasonically breaking the cells. The best conditions for P450 induction expression are: 25° C., 0.2 mM isopropyl-β-d-thiogalactoside (IPTG) and 0.5 mM Aminolevulinic acid (ALA) induction overnight.

On the basis of the above research results, the applicant proposes a scheme of the present application. In a typical implementation mode, a cytochrome P450 enzyme mutant is provided, and the mutant includes: (a) a protein with one or more amino acid mutations on a sequence of SEQ ID NO: 1, and the protein has the anti-Markov oxidation activity of the cytochrome P450 enzyme; or (b) a strain derived from *Bacillus megaterium*, having an amino acid sequence with more than 80% identity with SEQ ID NO: 1, and having anti-Markov oxidation activity of the cytochrome P450 enzyme.

On the basis of maintaining the activity of the cytochrome P450 enzyme, the mutants provided in this embodiment may further improve the enzyme reaction activity and/or the selectivity of the anti-Markov oxidation by the mutation of one or more amino acids, or by more than 80% of the identity between the mutated sequence and the sequence of the wild-type *Bacillus megaterium* strain.

The mutants obtained by the above-mentioned mutation methods in the present application are all within a scope of protection of the present application as long as the above conditions are satisfied.

In a preferred embodiment, the mutant generates any one or more of 1~14 amino acid mutations on the sequence of SEQ ID NO: 1, preferably 2~14, more preferably 3~14, and further preferably 10~14 amino acid mutations, and the mutant has the anti-Markov oxidation activity of the cytochrome P450 enzyme.

In a preferred embodiment, the mutant is a strain derived from *Bacillus megaterium*, and has more than 85%, preferably more than 90%, more preferably more than 95%, and further preferably more than 99% of identity with SEQ ID NO: 1, and has the anti-Markov oxidation activity of the cytochrome P450 enzyme; and further preferably, the mutant generates any one or more (such as 14, 13, 12, 11, 10, 9, 8, 7, 6, 5, 4, 3, 2 or 1) of 1~14 amino acid mutations, preferably 2~14, more preferably 3~14, and further preferably 10~14 amino acid mutations.

In a more preferred embodiment, the P450 enzyme mutant is a mutant with amino acid mutations as shown in Tables 1 to 4 based on SEQ ID NO: 1. The catalytic activity and/or selectivity of these mutants for catalyzing the anti-Markov oxidation reaction of the olefin compound are significantly higher than those of the wild type.

In a typical embodiment of the present invention, a DNA molecule is further provided, and the DNA molecule encodes any one of the above P450 enzyme mutants. The above P450 enzyme mutant encoded has the advantages of high selectivity and significantly improved catalytic activity.

In a typical embodiment of the present invention, a recombinant vector is further provided, and the recombinant vector is linked with the DNA molecule. The DNA molecule may encode any one of the above P450 enzyme mutants with the high selectivity and/or significantly improved catalytic activity. The specific sequence is selected from sequences in Table 1-Table 4 or nucleotide sequences with which the amino acid sequences of other sites undergo substitution, addition or deletion mutation on the premise of maintaining changes of the above amino acid site.

In the above recombinant vectors, any recombinant vectors that may be used to express the DNA molecule of the above hydroxylase are all applicable to the present invention. In a preferred embodiment of the present invention, the recombinant vector is selected from one of the following: pET-21b(+), pET-22b(+), pET-3a(+), pET-3d(+), pET-11a(+), pET-12a(+), pET-14b, pET-15b(+), pET-16b(+), pET-17b(+), pET-19b(+), pET-20b(+), pET-21a(+), pET-23a(+), pET-23b(+), pET-24a(+), pET-25b(+), pET-26b(+), pET-27b(+), pET-28a(+), pET-29a(+), pET-30a(+), pET-31b(+), pET-32a(+), pET-35b(+), pET-38b(+), pET-39b(+), pET-40b(+), pET-41a(+), pET-41b(+), pET-42a(+), pET-43a(+), pET-43b(+), pET-44a(+), pET-49b(+), pQE2, pQE9, pQE30, pQE31, pQE32, pQE40, pQE70, pQE80, pRSET-A, pRSET-B, pRSET-C, pGEX-5X-1, pGEX-6p-1, pGEX-6p-2, pBV220, pBV221, pBV222, pTrc99A, pTwin1, pEZZ18, pKK232-8, pUC-18 or pUC-19.

In a typical implementation mode of the present invention, a host cell is further provided, and the host cell contains any one of the above recombinant vectors. The specific host cell may be a prokaryotic cell or a eukaryotic cell, and preferably the eukaryotic cell is a yeast cell. More preferably, the above host cell is a competent cell, and further preferably the competent cell is an *Escherichia coli* BL21 cell or an *Escherichia coli* W3110 cell.

In a typical implementation mode of the present invention, a method of producing a carbonyl compound or an alcohol compound is further provided, and the preparation method includes: using any one of the above cytochrome P450 enzyme mutants to catalyze a direct anti-Markov oxidation reaction of an olefin compound

to generate the carbonyl compound

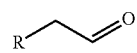

or the alcohol compound

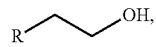

herein R represents an optionally substituted or unsubstituted alkyl, an optionally substituted or unsubstituted aralkyl, or an optionally substituted or unsubstituted aryl.

Preferably, R represents a group having 1-20 carbon atoms selected from an optionally substituted or unsubstituted alkyl, an optionally substituted or unsubstituted aralkyl, or an optionally substituted or unsubstituted aryl; more preferably, R represents a group having 1-10 carbon atoms selected from an optionally substituted or unsubstituted alkyl, an optionally substituted or unsubstituted aralkyl, or an optionally substituted or unsubstituted aryl; preferably, substituted refers to a substitution by a halogen atom, a nitrogen atom, a sulfur atom, a hydroxyl, a nitro group, a cyano group, a methoxy group, an ethoxy group, a carboxyl, a carboxymethyl, a carbon/ethyl or a methylenedioxy; preferably, the olefin compound is a styrene compound that is substituted or unsubstituted at any position on a benzene ring, and the reaction is the anti-Markov oxidation reaction of generating

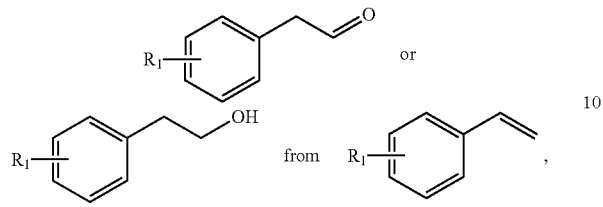

herein $R_1$ represents a halogen, a nitro group, a methyl or a methoxy group substituted at any position on the benzene ring.

Preferably, halogen substitution is a chlorine atom substitution.

More preferably, the olefin compound is any one of the following:

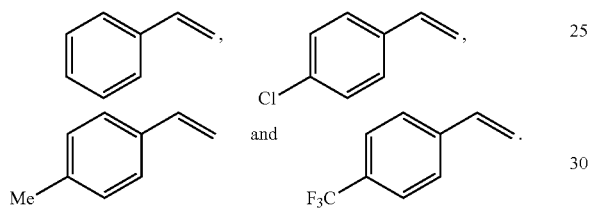

The beneficial effects of the present application are further described below in combination with specific embodiments. It should be noted that raw materials used in the following embodiments include:

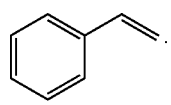

Raw material 1

Sytrene CasNo: 100-42-5

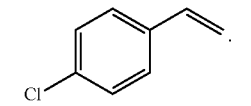

Raw material 2

4-Chlorostyrene CasNo: 1073-67-2

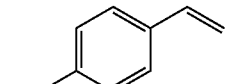

Raw material 3

4-Methylsytrene CasNo: 622-97-9

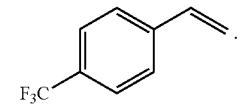

Raw material 4

4-(Trifluoromethyl) styrene CasNo: 402-50-6

EMBODIMENT 1

1.5 mM of Raw materials 1, 2, 3 and 4 were respectively added into a 10 mL glass bottle, 1 eq of oxidized nicotinamide adenine dinucleotide phosphate ($NADP^+$), 20 eq of glucose, 3 wt of glucose dehydrogenase, and 0.1 g of a P450 enzyme were added, the volume was supplemented to 4 mL with a Tris-HCl buffer (pH 8.0, and 100 mM). After being mixed uniformly, it was reacted in a shaker at 30° C. and 200 rpm for 3 h. After the reaction was completed, 2 mL of ethyl acetate was added. After being mixed fully, it was centrifuged at 12000 rpm for 5 min. A supernatant was taken and detected by high performance liquid chromatography (HPLC), and the wavelength was 210 nm. The reaction characteristics of some mutants were shown in Table 1.

TABLE 1

| Mutant | Raw material 1 | | Raw material 2 | | Raw material 3 | | Raw material 4 | |
|---|---|---|---|---|---|---|---|---|
| | Activity | Selectivity | Activity | Selectivity | Activity | Selectivity | Activity | Selectivity |
| Female parent (SEQ ID NO: 1) | − | − | − | − | − | − | − | − |
| V79A + F332A | − | + | + | ++ | + | + | + | ++ |
| V79A + F332A + A75V | + | + | − | − | ++ | + | − | + |
| V79A + F332A + A75F | − | + | + | − | + | + | + | + |
| V79A + F332A + L76A | + | ++ | + | ++ | + | ++ | + | ++ |
| V79A + F332A + L76I | + | ++ | − | + | − | − | + | − |
| V79A + F332A + V79L | ++ | + | − | ++ | ++ | − | + | ++ |
| V79A + F332A + V79F | + | − | + | + | + | ++ | + | + |
| V79A + F332A + A83F | + | − | − | + | + | − | − | − |
| V79A + F332A + A83V | + | ++ | − | + | + | ++ | − | − |
| V79A + F332A + F88A | − | + | + | ++ | + | − | ++ | + |
| V79A + F332A + F88V | + | + | − | ++ | + | − | + | + |
| V79A + F332A + T89A | − | − | + | − | − | + | + | − |
| V79A + F332A + T89V | + | − | + | + | + | − | + | + |
| V79A + F332A + A265V | − | + | − | + | + | − | | |
| V79A + F332A + A265F | − | + | − | − | − | + | − | + |
| V79A + F332A + T269V | + | + | − | − | − | + | + | + |

TABLE 1-continued

|  | Raw material 1 | | Raw material 2 | | Raw material 3 | | Raw material 4 | |
| --- | --- | --- | --- | --- | --- | --- | --- | --- |
| Mutant | Activity | Selectivity | Activity | Selectivity | Activity | Selectivity | Activity | Selectivity |
| V79A + F332A + T269A | − | + | − | − | + | + | − | − |
| V79A + F332A + T269F | − | + | − | − | − | + | + | + |
| V79A + F332A + A329V | + | + | + | + | − | + | − | + |
| V79A + F332A + A329F | + | − | − | + | + | − | − | − |
| V79A + F332A + A331F | + | ++ | − | + | + | ++ | − | − |
| V79A + F332A + A331V | − | + | + | ++ | + | − | ++ | + |
| V79A + F332A + F332V | + | + | − | ++ | + | − | + | + |
| V79A + F332A + L438A | − | + | − | + | + | + | + | + |
| V79A + F332A + L438F | − | − | − | + | − | − | + | − |

The above female parent is SEQ ID NO: 1; the times of activity and selectivity increased are represented by +, + represents increase by 0-1 times, ++ represents increase by 1-2 times, +++ represents increase by 2-3 times, ++++ represents increase by 3-5 times, and +++++ represents increase by 5-10 times. The selectivity/anti-Markov oxidation selectivity in the present invention is defined as: aldehyde product %/[(aldehyde product % + epoxy product %] in anti-Markov oxidation product.

EMBODIMENT 2

1.5 mM of Raw materials 1, 2, 3 and 4 were respectively added into a 10 mL glass bottle, 1 eq of NADP$^+$, 20 eq of glucose, 3 wt of glucose dehydrogenase, and 0.1 g of a P450 enzyme were added, the volume was supplemented to 4 mL with a Tris-HCl buffer (pH 8.0, and 100 mM). After being mixed uniformly, it was reacted in a shaker at 30° C. and 200 rpm for 3 h. After the reaction was completed, 2 mL of ethyl acetate was added. After being mixed fully, it was centrifuged at 12000 rpm for 5 min. A supernatant was taken and detected by HPLC, and the wavelength was 210 nm. The reaction characteristics of some mutants were shown in Table 2.

It may be seen from the results in Table 2 that the use of the directed evolution method of random mutation (error-prone PCR) greatly improves the mutant activity and the selectivity of anti-Markov oxidation. In the next step, an evolutionary method of saturation mutation may be continued to further improve the activity and selectivity of the mutant.

EMBODIMENT 3

3 mM of Raw materials 1, 2, 3 and 4 were respectively added into a 10 mL glass bottle, 0.5 eq of NADP$^+$, 10 eq of glucose, 1 wt of glucose dehydrogenase, and 0.1 g of a P450 enzyme were added, the volume was supplemented to 2 mL

TABLE 2

|  | Raw material1 | | Raw material 2 | | Raw material 3 | | Raw material 4 | |
| --- | --- | --- | --- | --- | --- | --- | --- | --- |
| Mutant | Activity | Selectivity | Activity | Selectivity | Activity | Selectivity | Activity | Selectivity |
| Female parent (SEQ ID NO: 1) | − | − | − | − | − | − | − | − |
| V79A + F332A | − | + | + | ++ | + | + | + | ++ |
| V79A + F332A + C63Y | + | ++ | + | ++ | + | ++ | + | ++ |
| V79A + F332A + C63Y + S107C | ++ | ++ | + | ++ | + | +++ | + | ++ |
| V79A + F332A + C63Y + S107C + Q129L | + | +++ | − | +++ | ++ | ++ | + | ++ |
| V79A + F332A + C63Y + S107C + Q129L + E229K | ++ | + | − | ++ | + | ++ | + | ++ |
| V79A + F332A + C63Y + S107C + Q129L + E229K + Q388L | + | ++ | + | + | + | ++ | ++ | +++ |
| V79A + F332A + C63Y + S107C + Q129L + E229K + Q388L + T428I | + | +++ | ++ | +++ | + | +++ | + | ++ |
| V79A + F332A + C63Y + S107C + Q129L + E229K + Q388L + T428I + N320I | ++ | ++ | − | + | ++ | ++ | + | +++ |
| V79A + F332A + C63Y + S107C + Q129L + E229K + Q388LT428I + S165G | + | ++ | + | ++ | + | ++ | + | +++ |
| V79A + F332A + C63Y + S107C + Q129L + E229K + Q388LT428I + F78L | + | + | − | ++ | + | ++ | − | ++ |
| V79A + F332A + C63Y + S107C + Q129L + E229K + Q388L + T428I + F78L + I175S | ++ | +++ | ++ | +++ | + | ++ | + | +++ |

The above female parent is SEQ ID NO: 1; the times of activity and selectivity increased are represented by +, + represents increase by 0-1 times, ++ represents increase by 1-2 times, +++ represents increase by 2-3 times, ++++ represents increase by 3-5 times, and +++++ represents increase by 5-10 times.

with a Tris-HCl buffer (pH 8.0, and 100 mM). After being mixed uniformly, it was reacted in a shaker at 40° C. and 200 rpm for 8 h. After the reaction was completed, 2 mL of ethyl acetate was added. After being mixed fully, it was centrifuged at 12000 rpm for 5 min. A supernatant was taken and detected by HPLC, and the wavelength was 210 nm. The reaction characteristics of some mutants were shown in Table 3.

TABLE 3

| Mutant | Raw material 1 | | Raw material 2 | | Raw material 3 | | Raw material 4 | |
|---|---|---|---|---|---|---|---|---|
| | Activity | Selectivity | Activity | Selectivity | Activity | Selectivity | Activity | Selectivity |
| Female parent (SEQ ID NO: 1) | − | − | − | − | − | − | − | − |
| V79A + F332A + C63Y + S107C + Q129L + E229K + Q388L + T428I + F78L + I175S | ++ | + | ++ | ++ | ++ | + | + | ++ |
| V79A + F332A + C63Y + S107C + Q129L + E229K + Q388L + T428I + F78L + I175S + A331P | ++ | +++ | + | ++ | ++ | +++ | + | +++ |
| V79A + F332A + C63Y + S107C + Q129L + E229K + Q388L + T428I + F78L + I175S + A331G | ++ | +++ | + | ++ | + | +++ | + | +++ |
| V79A + F332A + C63Y + S107C + Q129L + E229K + Q388L + T428I + F78L + I175S + A331D | + | +++ | + | ++ | + | +++ | + | ++ |
| V79A + F332A + C63Y + S107C + Q129L + E229K + Q388L + T428I + F78L + I175S + A329K | ++ | ++ | ++ | ++++ | ++ | +++ | + | ++ |
| V79A + F332A + C63Y + S107C + Q129L + E229K + Q388L + T428I + F78L + I175S + A329L | + | +++ | + | ++++ | ++ | ++ | ++ | +++ |
| V79A + F332A + C63Y + S107C + Q129L + E229K + Q388L + T428I + F78L + I175S + A75R | + | ++ | ++ | ++++ | ++ | +++ | + | ++ |
| V79A + F332A + C63Y + S107C + Q129L + E229K + Q388L + T428I + F78L + I175S + A329Y + A331P | ++ | +++ | ++ | + | ++ | ++ | + | ++ |
| V79A + F332A + C63Y + S107C + Q129L + E229K + Q388L + T428I + F78L + I175S + A329L + A331P | + | +++ | + | ++ | + | +++ | + | ++ |
| V79A + F332A + C63Y + S107C + Q129L + E229K + Q388L + T428I + F78L + I175S + A329K + A331F | ++ | +++ | +++ | +++++ | ++ | ++ | + | ++ |
| V79A + F332A + C63Y + S107C + Q129L + E229K + Q388L + T428I + F78L + I175S + A329K + A331R | ++ | +++ | ++ | ++++ | + | ++ | ++ | ++ |
| V79A + F332A + C63Y + S107C + Q129L + E229K + Q388L + T428I + F78L + I175S + A329K + A331D | ++ | ++ | ++ | ++++ | ++ | +++ | ++ | ++ |
| V79A + F332A + C63Y + S107C + Q129L + E229K + Q388L + T428I + F78L + I175S + A329K + R48H | ++ | ++ | ++ | +++ | ++ | +++ | ++ | +++ |
| V79A + F332A + C63Y + S107C + Q129L + E229K + Q388L + T428I + F78L + I175S + A329K + Y52G | ++ | ++ | ++ | +++ | + | ++ | ++ | +++ |
| V79A + F332A + C63Y + S107C + Q129L + E229K + Q388L + T428I + F78L + I175S + A329K + Q74L | ++ | +++ | ++ | +++ | ++ | ++ | ++ | ++ |
| V79A + F332A + C63Y + S107C + Q129L + E229K + Q388L + T428I + F78L + I175S + A329K + T269P | ++ | +++ | ++ | +++ | ++ | ++ | ++ | +++ |
| V79A + F332A + C63Y + S107C + Q129L + E229K + Q388L + T428I + F78L + I175S + A329K + S333H | ++ | +++ | + | ++++ | + | ++ | + | ++ |
| V79A + F332A + C63Y + S107C + Q129L + E229K + Q388L + T428I + F78L + I175S + A329K + S333M | ++ | +++ | + | ++++ | ++ | ++ | ++ | ++ |
| V79A + F332A + C63Y + S107C + Q129L + E229K + Q388L + T428I + F78L + I175S + A329K + M355F | + | +++ | + | ++++ | ++ | ++ | ++ | ++ |
| V79A + F332A + C63Y + S107C + Q129L + E229K + Q388L + T428I + F78L + I175S + A329K + M355K | ++ | +++ | ++ | ++++ | + | +++ | ++ | +++ |
| V79A + F332A + C63Y + S107C + Q129L + E229K + Q388L + T428I + F78L + I175S + A329K + L182I | + | +++ | + | ++++ | ++ | ++ | ++ | +++ |
| V79A + F332A + C63Y + S107C + Q129L + E229K + Q388L + T428I + F78L + I175S + A329K + L182M | ++ | +++ | + | ++++ | ++ | ++ | + | ++ |

The above female parent is SEQ ID NO: 1; the times of activity and selectivity increased are represented by +, + represents increase by 0-1 times, ++ represents increase by 1-2 times, +++ represents increase by 2-3 times, ++++ represents increase by 3-5 times, and +++++ represents increase by 5-10 times.

EMBODIMENT 4

3 mM of Raw materials 1, 2, 3 and 4 were respectively added into a 10 mL glass bottle, 0.5 eq of NADP$^+$, 10 eq of glucose, 1 wt of glucose dehydrogenase, and 0.1 g of a P450 enzyme were added, the volume was supplemented to 2 mL with a Tris-HCl buffer (pH 8.0, and 100 mM). After being mixed uniformly, it was reacted in a shaker at 40° C. and 200 rpm for 8 h. After the reaction was completed, 2 mL of ethyl acetate was added. After being mixed fully, it was centrifuged at 12000 rpm for 5 min. A supernatant was taken and detected by HPLC, and the wavelength was 210 nm. The reaction characteristics of some mutants were shown in Table 4.

TABLE 4

| Mutant | Raw material 1 | | Raw material 2 | | Raw material 3 | | Raw material 4 | |
|---|---|---|---|---|---|---|---|---|
| | Activity | Selectivity | Activity | Selectivity | Activity | Selectivity | Activity | Selectivity |
| Female parent (SEQ ID NO: 1) | − | − | − | − | − | − | − | − |
| V79A + F332A + C63Y + S107C + Q129L + E229K + Q388L + T428I + F78L + I175S + A329K + A331F + S333Q | +++ | ++ | +++ | +++ | ++ | +++ | + | +++ |
| V79A + F332A + C63Y + S107C + Q129L + E229K + Q388L + T428I + F78L + I175S + A329K + A331F + S333V | ++ | +++ | ++ | ++++ | ++ | +++ | ++ | ++ |
| V79A + F332A + C63Y + S107C + Q129L + E229K + Q388L + T428I + F78L + I175S + A329K + A331F + W91M | ++ | +++ | +++ | ++++ | + | ++ | ++ | +++ |
| V79A + F332A + C63Y + S107C + Q129L + E229K + Q388L + T428I + F78L + I175S + A329K + A331F + S90C | + | +++ | +++ | ++++ | ++ | +++ | ++ | +++ |
| V79A + F332A + C63Y + S107C + Q129L + E229K + Q388L + T428I + F78L + I175S + A329K + A331F + L18V | ++ | ++ | ++ | ++++ | ++ | +++ | ++ | +++ |
| V79A + F332A + C63Y + S107C + Q129L + E229K + Q388L + T428I + F78L + I175S + A329K + A331F + S90V | ++ | ++++ | +++ | ++++ | ++ | +++ | ++ | +++ |
| V79A + F332A + C63Y + S107C + Q129L + E229K + Q388L + T428I + F78L + I175S + A329K + A331F + S90G | ++ | +++ | ++ | ++++ | ++ | +++ | +++ | +++ |
| V79A + F332A + C63Y + S107C + Q129L + E229K + Q388L + T428I + F78L + I175S + A329K + S333H + L182A | ++ | +++ | +++ | ++++ | ++ | +++ | ++ | +++ |
| V79A + F332A + C63Y + S107C + Q129L + E229K + Q388L + T428I + F78L + I175S + A329K + S333H + L182G | + | +++ | +++ | ++++ | + | ++ | +++ | +++ |
| V79A + F332A + C63Y + S107C + Q129L + E229K + Q388L + T428I + F78L + I175S + A329K + S333H + L182M | ++ | ++++ | ++ | ++++ | ++ | +++ | ++ | +++ |
| V79A + F332A + C63Y + S107C + Q129L + E229K + Q388L + T428I + F78L + I175S + A329K + S333H + L182F | +++ | +++ | +++ | +++++ | ++ | +++ | ++ | +++ |
| V79A + F332A + C63Y + S107C + Q129L + E229K + Q388L + T428I + F78L + I175S + A329K + S333H + A331P | +++ | +++ | ++ | ++++ | ++ | ++ | ++ | +++ |
| V79A + F332A + C63Y + S107C + Q129L + E229K + Q388L + T428I + F78L + I175S + A329K + S333H + A331S | ++ | ++ | +++ | ++++ | ++ | +++ | ++ | ++ |
| V79A + F332A + C63Y + S107C + Q129L + E229K + Q388L + T428I + F78L + I175S + A329K + S333M + M355G | + | ++++ | +++ | ++++ | ++ | ++ | ++ | +++ |
| V79A + F332A + C63Y + S107C + Q129L + E229K + Q388L + T428I + F78L + I175S + A329K + S333M + M355W | ++ | +++ | ++ | ++++ | + | +++ | ++ | ++ |
| V79A + F332A − C63Y + S107C + Q129L + E229K + Q388L + T428I + F78L + I175S + A329K + S333M + A331D | ++ | ++++ | +++ | ++++ | ++ | +++ | ++ | +++ |
| V79A + F332A + C63Y + S107C + Q129L + E229K + Q388L + T428I + F78L + I175S + A329K + S333H + L182F + S73G | ++ | +++ | ++ | ++++ | ++ | +++ | + | +++ |
| V79A + F332A + C63Y + S107C + Q129L + E229K + Q388L + T428I + F78L + I175S + A329K + S333H + L182F + W91F | ++ | +++ | +++ | ++++ | ++ | +++ | ++ | +++ |
| V79A + F332A + C63Y + S107C + Q129L + E229K + Q388L + T428I + F78L + I175S + A329K + S333H + L182F + P173Q | +++ | +++ | +++ | +++++ | +++ | +++ | +++ | +++ |
| V79A + F332A + C63Y + S107C + Q129L + E229K + Q388L + T428I + F78L + I175S + A329K + S333H + L182F + P173R | ++ | +++ | ++ | ++++ | ++ | ++ | + | +++ |

TABLE 4-continued

| Mutant | Raw material 1 | | Raw material 2 | | Raw material 3 | | Raw material 4 | |
|---|---|---|---|---|---|---|---|---|
| | Activity | Selectivity | Activity | Selectivity | Activity | Selectivity | Activity | Selectivity |
| V79A + F332A + C63Y + S107C + Q129L + E229K + Q388L + T428I + F78L + I175S + A329K + S333H + L182F + L72F | +++ | +++ | +++ | ++++ | ++ | +++ | ++ | +++ |
| V79A + F332A + C63Y + S107C + Q129L + E229K + Q388L + T428I + F78L + I175S + A329K + S333H + L182F + S73A | + | +++ | ++ | ++++ | ++ | ++ | ++ | ++ |

The above female parent is SEQ ID NO: 1; the times of activity and selectivity increased are represented by +, + represents increase by 0-1 times, ++ represents increase by 1-2 times, +++ represents increase by 2-3 times, ++++ represents increase by 3-5 times, and +++++ represents increase by 5-10 times.

EMBODIMENT 5

In a reaction system in which Raw materials 1, 2, 3 and 4 were oxidized by a P450 mutant to generate an aldehyde product, 10 U of alcohol dehydrogenase (ADH) (Sigma Company), 1 mM of NADP$^+$, and 1% isopropanol in total volume were added. After being mixed uniformly, it was reacted in a shaker at 40° C. and 200 rpm for 1 h. After the reaction was completed, 2 mL of ethyl acetate was added. After being mixed fully, it was centrifuged at 12000 rpm for 5 min. A supernatant was taken and detected by HPLC, and the wavelength was 210 nm. The reaction characteristics of some mutants were shown in Table 5.

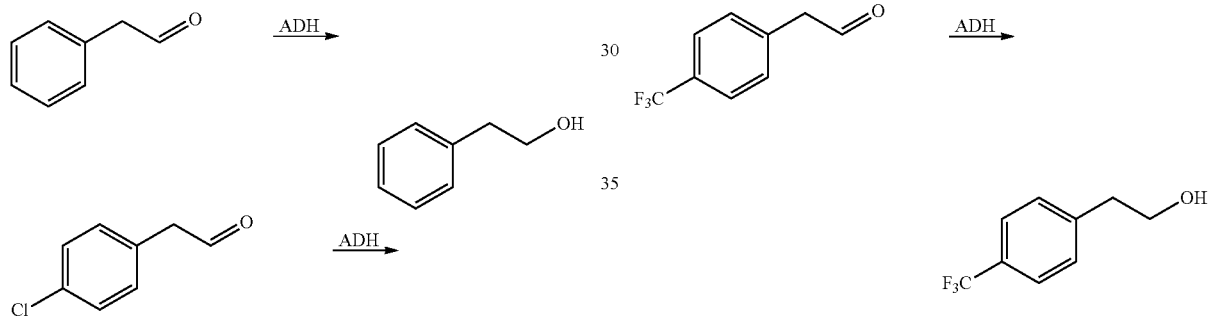

TABLE 5

| Mutant | Raw material 1 Activity | Raw material 2 Activity | Raw material 3 Activity | Raw material 4 Activity |
|---|---|---|---|---|
| Female parent (SEQ ID NO: 1) | * | * | * | * |
| V79A + F332A + C63Y + S107C + Q129L + E229K + Q388L + T428I + F78L + I175S + A329K + A331F + S333Q | * | * | * | * |
| V79A + F332A + C63Y + S107C + Q129L + E229K + Q388L + T428I + F78L + I175S + A329K + A331F + S333V | * | * | * | * |
| V79A + F332A + C63Y + S107C + Q129L + E229K + Q388L + T428I + F78L + I175S + A329K + A331F + W91M | * | * | * | * |
| V79A + F332A + C63Y + S107C + Q129L + E229K + Q388L + T428I + F78L + I175S + A329K + A331F + S90C | * | * | * | * |
| V79A + F332A + C63Y + S107C + Q129L + E229K + Q388L + T428I + F78L + I175S + A329K + A331F + L18V | * | * | * | * |
| V79A + F332A + C63Y + S107C + Q129L + E229K + Q388L + T428I + F78L + I175S + A329K + A331F + S90V | * | * | * | * |
| V79A + F332A + C63Y + S107C + Q129L + E229K + Q388L + T428I + F78L + I175S + A329K + A331F + S90G | * | * | * | * |
| V79A + F332A + C63Y + S107C + Q129L + E229K + Q388L + T428I + F78L + I175S + A329K + S333H + L182A | * | * | * | * |
| V79A + F332A + C63Y + S107C + Q129L + E229K + Q388L + T428I + F78L + I175S + A329K + S333H + L182G | * | * | * | * |
| V79A + F332A + C63Y + S107C + Q129L + E229K + Q388L + T428I + F78L + I175S + A329K + S333H + L182M | * | * | * | * |
| V79A + F332A + C63Y + S107C + Q129L + E229K + Q388L + T428I + F78L + I175S + A329K + S333H + L182F | * | * | * | * |

TABLE 5-continued

| Mutant | Raw material 1 Activity | Raw material 2 Activity | Raw material 3 Activity | Raw material 4 Activity |
|---|---|---|---|---|
| V79A + F332A + C63Y + S107C + Q129L + E229K + Q388L + T428I + F78L + I175S + A329K + S333H + A331P | * | * | * | * |
| V79A + F332A + C63Y + S107C + Q129L + E229K + Q388L + T428I + F78L + I175S + A329K + S333H + A331S | * | * | * | * |
| V79A + F332A + C63Y + S107C + Q129L + E229K + Q388L + T428I + F78L + I175S + A329K + S333M + M355G | * | * | * | * |
| V79A + F332A + C63Y + S107C + Q129L + E229K + Q388L + T428I + F78L + I175S + A329K + S333M + M355W | * | * | * | * |
| V79A + F332A-C63Y + S107C + Q129L + E229K + Q388L + T428I + F78L + I175S + A329K + S333M + A331D | * | * | * | * |
| V79A + F332A + C63Y + S107C + Q129L + E229K + Q388L + T428I + F78L + I175S + A329K + S333H + L182F + S73G | * | * | * | * |
| V79A + F332A + C63Y + S107C + Q129L + E229K + Q388L + T428I + F78L + I175S + A329K + S333H + L182F + W91F | * | * | * | * |
| V79A + F332A + C63Y + S107C + Q129L + E229K + Q388L + T428I + F78L + I175S + A329K + S333H + L182F + P173Q | * | * | * | * |
| V79A + F332A + C63Y + S107C + Q129L + E229K + Q388L + T428I + F78L + I175S + A329K + S333H + L182F + P173R | * | * | * | * |
| V79A + F332A + C63Y + S107C + Q129L + E229K + Q388L + T428I + F78L + I175S + A329K + S333H + L182F + L72F | * | * | * | * |
| V79A + F332A + C63Y + S107C + Q129L + E229K + Q388L + T428I + F78L + I175S + A329K + S333H + L182F + S73A | * | * | * | * |

The above female parent is SEQ ID NO: 1; and * represents that the aldehyde product is completely converted into an alcohol product.

From the above descriptions, it may be seen that the above embodiments of the present invention achieve the following technical effects: the activity and/or selectivity of the modified mutants are all improved to varying degrees.

In addition, other arbitrary combinations of the mutation sites disclosed in the present application and the duplication of the mutation sites on other P450 enzymes with the higher identity may also have the better effects.

The above are only preferred embodiments of the present invention, and are not intended to limit the present invention. For those skilled in the art, the present invention may have various modifications and changes. Any modifications, equivalent replacements, improvements and the like made within the spirit and principle of the present invention shall be included in the scope of protection of the present invention.

What is claimed is:

1. A cytochrome P450 enzyme mutant, wherein the cytochrome P450 enzyme obtained from *Bacillus megaterium*;
wherein the cytochrome P450 enzyme mutant has the amino acid sequence of SEQ ID NO: 1 with a mutation of one or more amino acids:

V79A + F332A
V79A + F332A + A75V
V79A + F332A + A75F
V79A + F332A + L76A
V79A + F332A + A83F
V79A + F332A + A83V
V79A + F332A + F88A
V79A + F332A + F88V
V79A + F332A + T89A
V79A + F332A + T89V
V79A + F332A + A265V
V79A + F332A + A265F
V79A + F332A + T269V
V79A + F332A + T269A
V79A + F332A + T269F
V79A + F332A + A329V
V79A + F332A + A329F
V79A + F332A + A331F
V79A + F332A + A331V
V79A + F332A + L438A
V79A + F332A + L438F
V79A + F332A + C63Y
V79A + F332A + C63Y + S107C
V79A + F332A + C63Y + S107C + Q129L
V79A + F332A + C63Y + S107C + Q129L + E229K
V79A + F332A + C63Y + S107C + Q129L + E229K + Q388L
V79A + F332A + C63Y + S107C + Q129L + E229K + Q388L + T428I
V79A + F332A + C63Y + S107C + Q129L + E229K + Q388L + T428I + N320I
V79A + F332A + C63Y + S107C + Q129L + E229K + Q388L + T428I + S165G
V79A + F332A + C63Y + S107C + Q129L + E229K + Q388L + T428I + F78L
V79A + F332A + C63Y + S107C + Q129L + E229K + Q388L + T428I + F78L + I175S
V79A + F332A + C63Y + S107C + Q129L + E229K + Q388L + T428I + F78L + I175S + A331P
V79A + F332A + C63Y + S107C + Q129L + E229K + Q388L + T428I + F78L + I175S + A331G
V79A + F332A + C63Y + S107C + Q129L + E229K + Q388L + T428I + F78L + I175S + A331D
V79A + F332A + C63Y + S107C + Q129L + E229K + Q388L + T428I + F78L + I175S + A329K
V79A + F332A + C63Y + S107C + Q129L + E229K + Q388L + T428I + F78L + I175S + A329L
V79A + F332A + C63Y + S107C + Q129L + E229K + Q388L + T428I + F78L + I175S + A75R
V79A + F332A + C63Y + S107C + Q129L + E229K + Q388L + T428I + F78L + I175S + A329Y + A331P
V79A + F332A + C63Y + S107C + Q129L + E229K + Q388L + T428I + F78L + I175S + A329L + A331P
V79A + F332A + C63Y + S107C + Q129L + E229K + Q388L + T428I + F78L + I175S + A329K + A331F
V79A + F332A + C63Y + S107C + Q129L + E229K + Q388L + T428I + F78L + I175S + A329K + A331R
V79A + F332A + C63Y + S107C + Q129L + E229K + Q388L + T428I + F78L + I175S + A329K + A331D
V79A + F332A + C63Y + S107C + Q129L + E229K + Q388L + T428I + F78L + I175S + A329K + R48H
V79A + F332A + C63Y + S107C + Q129L + E229K + Q388L + T428I + F78L + I175S + A329K + Y52G
V79A + F332A + C63Y + S107C + Q129L + E229K + Q388L + T428I + F78L + I175S + A329K + Q74L
V79A + F332A + C63Y + S107C + Q129L + E229K + Q388L + T428I + F78L + I175S + A329K + T269P
V79A + F332A + C63Y + S107C + Q129L + E229K + Q388L + T428I + F78L + I175S + A329K + S333H
V79A + F332A + C63Y + S107C + Q129L + E229K + Q388L + T428I + F78L + I175S + A329K + S333M
V79A + F332A + C63Y + S107C + Q129L + E229K + Q388L + T428I + F78L + I175S + A329K + M355F
V79A + F332A + C63Y + S107C + Q129L + E229K + Q388L + T428I + F78L + I175S + A329K + M355K
V79A + F332A + C63Y + S107C + Q129L + E229K + Q388L + T428I + F78L + I175S + A329K + L182I
V79A + F332A + C63Y + S107C + Q129L + E229K + Q388L + T428I + F78L + I175S + A329K + L182M
V79A + F332A + C63Y + S107C + Q129L + E229K + Q388L + T428I + F78L + I175S + A329K + A331F + S333Q
V79A + F332A + C63Y + S107C + Q129L + E229K + Q388L + T428I + F78L + I175S + A329K + A331F + S333V
V79A + F332A + C63Y + S107C + Q129L + E229K + Q388L + T428I + F78L + I175S + A329K + A331F + W91M
V79A + F332A + C63Y + S107C + Q129L + E229K + Q388L + T428I + F78L + I175S + A329K + A331F + S90C
V79A + F332A + C63Y + S107C + Q129L + E229K + Q388L + T428I + F78L + I175S + A329K + A331F + L18V
V79A + F332A + C63Y + S107C + Q129L + E229K + Q388L + T428I + F78L + I175S + A329K + A331F + S90V
V79A + F332A + C63Y + S107C + Q129L + E229K + Q388L + T428I + F78L + I175S + A329K + A331F + S90G
V79A + F332A + C63Y + S107C + Q129L + E229K + Q388L + T428I + F78L + I175S + A329K + S333H + L182A
V79A + F332A + C63Y + S107C + Q129L + E229K + Q388L + T428I + F78L + I175S + A329K + S333H + L182G
V79A + F332A + C63Y + S107C + Q129L + E229K + Q388L + T428I + F78L + I175S + A329K + S333H + L182M
V79A + F332A + C63Y + S107C + Q129L + E229K + Q388L + T428I + F78L + I175S + A329K + S333H + L182F
V79A + F332A + C63Y + S107C + Q129L + E229K + Q388L + T428I + F78L + I175S + A329K + S333H + A331P
V79A + F332A + C63Y + S107C + Q129L + E229K + Q388L + T428I + F78L + I175S + A329K + S333H + A331S
V79A + F332A + C63Y + S107C + Q129L + E229K + Q388L + T428I + F78L + I175S + A329K + S333M + M355W
V79A + F332A + C63Y + S107C + Q129L + E229K + Q388L + T428I + F78L + I175S + A329K + S333M + M355G
V79A + F332A + C63Y + S107C + Q129L + E229K + Q388L + T428I + F78L + I175S + A329K + S333M + A331D
V79A + F332A + C63Y + S107C + Q129L + E229K + Q388L + T428I + F78L + I175S + A329K + S333H + L182F + S73G
V79A + F332A + C63Y + S107C + Q129L + E229K + Q388L + T428I + F78L + I175S + A329K + S333H + L182F + W91F

-continued

V79A + F332A + C63Y + S107C + Q129L + E229K + Q388L + T428I + F78L + I175S + A329K + S333H + L182F + P173Q
V79A + F332A + C63Y + S107C + Q129L + E229K + Q388L + T428I + F78L + I175S + A329K + S333H + L182F + P173R
V79A + F332A + C63Y + S107C + Q129L + E229K + Q388L + T428I + F78L + I175S + A329K + S333H + L182F + L72F
V79A + F332A + C63Y + S107C + Q129L + E229K + Q388L + T428I + F78L + I175S + A329K + S333H + L182F + S73A.

2. A DNA molecule encoding the mutant of claim 1.

3. A recombinant vector comprising the DNA molecule of claim 2.

4. The recombinant vector of claim 3, wherein the recombinant vector is selected from the group consisting of: pET-21b(+), pET-22b(+), pET-3a(+), pET-3d(+), pET-11a(+), pET-12a(+), pET-14b(+), pET-15b(+), pET-16b(+), pET-17b(+), pET-19b(+), pET-20b(+), pET-21a(+), pET-23a(+), pET-23b(+), pET-24a(+), pET-25b(+), pET-26b(+), pET-27b(+), pET-28a(+), pET-29a(+), pET-30a(+), pET-31b(+), pET-32a(+), pET-35b(+), pET-38b(+), pET-39b(+), pET-40b(+), pET-41a(+), pET-41b(+), pET-42a(+), pET-43a(+), pET-43b(+), pET-44a(+), pET-49b(+), pQE2, pQE9, pQE30, pQE31, pQE32, pQE40, pQE70, pQE80, pRSET-A, pRSET-B, pRSET-C, pGEX-5X-1, pGEX-6p-1, pGEX-6p-2, pBV220, pBV221, pBV222, pTrc99A, pTwin1, pEZZ18, pKK232-18, pUC-18 and pUC-19.

5. An isolated host cell, comprising the recombinant vector of claim 3.

6. The host cell of claim 5, wherein the host cell is a prokaryotic cell or an eukaryotic cell, wherein the eukaryotic cell is a yeast cell.

7. The host cell of claim 6, wherein the host cell is a competent cell.

8. The host cell of claim 6, wherein the competent cell is *E. coli* BL21 cell or *E. coli* W3110.

9. A method of producing a carbonyl compound or an alcohol compound, wherein the method comprises:
catalyzing an olefin compound

using the cytochrome P450 enzyme mutant of claim 1 for a direct anti-Markovnikov oxidation reaction to generate a carbonyl compound

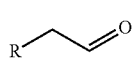

and an alcohol compound

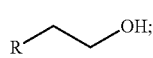

wherein R is selected from the group consisting of substituted of unsubstituted alkyl group, substituted or unsubstituted aralkyl group, and substituted or unsubstituted aryl group.

10. The method of claim 9, wherein R represents a group having 1-20 carbon atoms selected from the group consisting of substituted or unsubstituted alkyl group, substituted or unsubstituted aralkyl group, and substituted or unsubstituted aryl group.

11. The method of claim 9, wherein R represents a group having 1-10 carbon atoms selected from the group consisting of substituted or unsubstituted alkyl group, substituted or unsubstituted aralkyl group, and substituted or unsubstituted aryl group.

12. The method of claim 11, wherein the substituted refers to a substitution by a halogen atom, a nitrogen atom, a sulfur atom, a hydroxyl group, a nitro group, a cyano group, a methoxy group, an ethyoxyl group, a carboxyl group, a carboxymethyl group, a carboxyethyl group or a methylenedioxy group.

13. The method of claim 9, wherein the olefin compound is a styrene compound substituted or unsubstituted at any position on the benzene ring, and the reaction is an anti-Markovnikov oxidation reaction of to generate

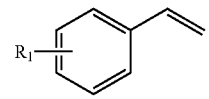

to generate

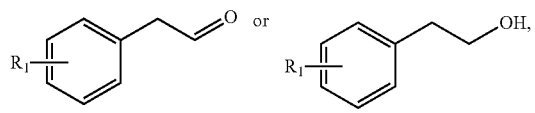

wherein R1 represents that any position on the benzene ring is substituted with halogen, a nitro group, a methyl group or a methoxy group.

14. The method of claim 13, wherein the halogen is a chlorine atom.

15. The method of claim 9, wherein the olefinic compound is selected from any one of the groun consisting of

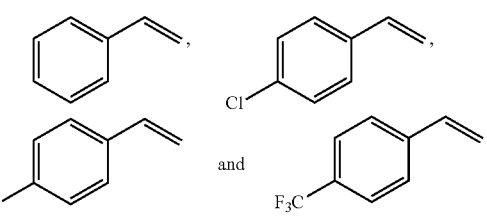

* * * * *